Patented May 30, 1933

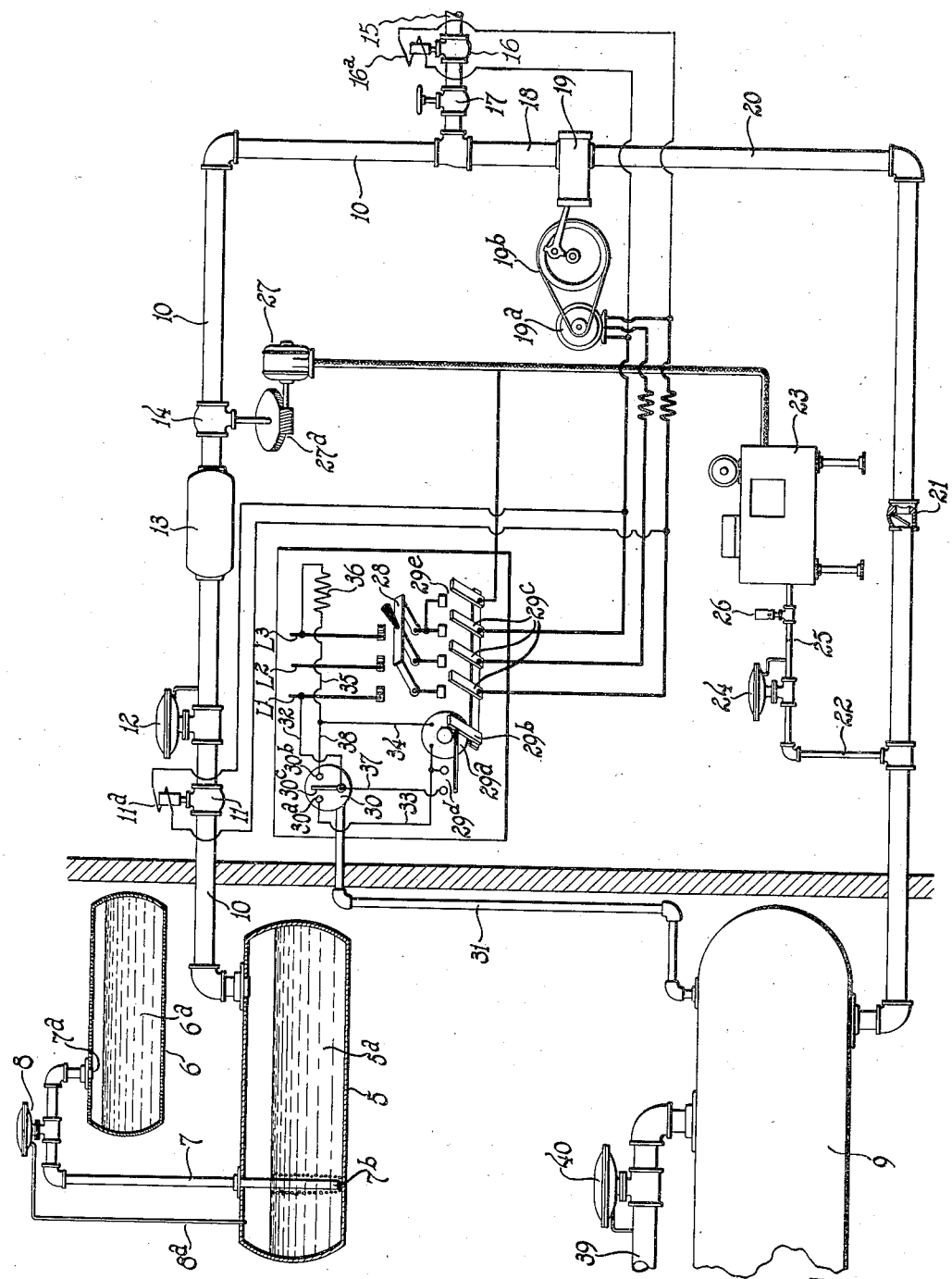

1,912,044

UNITED STATES PATENT OFFICE

EDWIN X. SCHMIDT, OF WHITEFISH BAY, WISCONSIN, ASSIGNOR TO CUTLER-HAMMER, INC., OF MILWAUKEE, WISCONSIN, A CORPORATION OF DELAWARE

METHOD OF AND APPARATUS FOR MAKING COMBUSTIBLE GAS

Application filed June 10, 1931. Serial No. 543,439.

This invention relates to an improved method of and apparatus for making combustible gas. While not limited thereto, the invention relates more particularly to an improved form of butane gas plant and an improved method of operating the same.

In certain sections of this country butane gas plants are being commonly employed as a simple and economical means for supplying gas to towns or communities having populations ranging from one thousand to twenty-five thousand.

These plants consist essentially of one or more liquid butane storage tanks. Butane vapor is taken directly from the liquid storage tank or tanks and proportionally mixed with air to provide a final mixture having the desired potential heating value per unit volume. The finished mixed gas is then compressed to a predetermined relatively high degree and is discharged into a storage container or tank which is of the high pressure type. In plants of this type the liquid butane storage tank is used as the vaporizer. When a liquid butane storage tank of approximately 15,000 gallons capacity is not lagged or covered with insulation the normal heat loss from the tank to atmosphere amounts to approximately 1000 B. t. u. per hour when the tank contents are 1 degree F. warmer than atmosphere. For practical reasons it is necessary to maintain within the liquid storage tank a pressure slightly above atmospheric pressure. When substantially pure butane liquid alone is employed it is known that the temperature thereof must be maintained at or above approximately 30 degrees F. in order to provide the aforementioned pressure in the liquid storage tank. Obviously this requirement becomes quite serious when the plant is to be operated under conditions of zero or sub-zero temperature, for then sufficient heat must be supplied to the butane liquid, over and above that necessary for vaporization, to maintain the tank contents at a temperature of at least 30 degrees F. Lagging of the tank would then become necessary or desirable to decrease the amount of heat required to be supplied. However, if the ambient temperature went over 30 degrees F. such lagging would become objectionable, for without lagging some heat for vaporization of the liquid butane would be obtainable from atmosphere.

An object of my invention is to provide a method of gas plant operation whereby the necessity for application of artificial heat to the volatile combustible liquid or liquids employed is eliminated.

Another object is to eliminate the necessity for insulating or lagging the liquid storage container.

Another object is to provide a method of gas plant operation which is substantially unaffected by any normal or probable variations in temperature conditions.

Another object is to provide novel means for accomplishment of the results aforementioned.

Another and more specific object is to provide a butane gas plant adapted for full automatic operation substantially independently of relatively wide variations in ambient temperature conditions.

Another object is to provide a novel method of and means for automatically producing a gas of predetermined total heating value per unit volume.

Another object is to provide a novel method of and means for insuring generation and supply of a predetermined volume of combustible vapor or gas under substantially all temperature conditions.

Another object is to provide a method of and apparatus for making a combustible gas mixture which may be stored at relatively high pressures and/or relatively low temperatures without liability of condensation of the combustible constituents thereof.

Other objects and advantages of the invention will hereinafter appear.

The accompanying drawings schematically and diagramatically illustrates an embodiment of my invention,—it being understood that the invention is susceptible of embodiment in other forms without departing from the scope of the appended claims.

Referring to the drawing, the numeral 5 designates a tank which acts as a storage container for liquid butane and as an evaporator for such liquid. Tank 5 may be assumed to have a capacity of approximately 15,000 gallons so that the same may be filled to about two-thirds of its capacity by the contents of a tank car of usual size. Obviously, however, the tank 5 may be of any desired capacity to suit the particular requirements of each installation. Another tank 6, which may be of considerably smaller capacity than tank 5, acts as a storage container for liquid propane and as an evaporator for the latter liquid.

Tank 6 is connected with tank 5 through a conduit 7, said conduit having its inlet end 7ª located above the level of the liquid propane 6ª within tank 6 and preferably having its outlet end 7ᵇ located below the level of the liquid butane 5ª within tank 5. While I prefer to have the outlet end 7ᵇ submerged in the liquid butane, as shown, it may be satisfactory under certain conditions to merely have the propane vapor passing through conduit 7 impinge against the surface of the liquid butane in tank 5. Also as an alternative arrangement it may be found desirable in certain cases to have the inlet 7ª of conduit 7 submerged within the liquid in tank 6 whereby transfer of a controlled quantity of liquid propane from tank 6 to tank 5 may be effected.

As is well understood by those skilled in the art, at any given temperature common to the bodies of butane and propane in tanks 5 and 6, respectively, the vapor pressure of the propane will greatly exceed the vapor pressure of the butane. Also as is well known the price per unit volume of liquid propane is considerably higher than that of liquid butane. Moreover, in view of the fact that butane contains a substantially larger number of B. t. u's. per unit volume than a corresponding volume of propane, it is expedient to use the propane vapor generated in tank 6 only when necessary for accomplishment of the results herein contemplated.

I therefore provide within conduit 7 a valve 8, said valve as shown being of a well known pressure responsive type. Thus it may be assumed that valve 8 is biased to open position, and one side of the diaphragm thereof is subjected through conduit 8ª to the pressure conditions obtaining within tank 5, said valve being adjusted to provide for automatic closing thereof when the pressure within tank 5 exceeds a preselected value.

Assuming, for example, that the gas plant is to be operated at a locality where the temperature may go to 40 degrees below zero Fahrenheit, with atmospheric pressure of approximately 12.7 pounds. To insure against condensation of butane in the mixed gas holder 9 (to be described hereinafter) with 75 pounds gauge pressure and 550 B. t. u. gas, I have calculated that a pressure of at least 18.8 pounds absolute (or 6.1 pounds gauge) should be maintained within tank 5. The particular calculations are based upon local conditions existing at Klamath Falls, Oregon,—allowing for a factor of safety of eight degrees below the minimum temperature reported there in thirty years, and permitting the use of the storage holder 9 at full rated capacity of 75 pounds gauge.

The operation of this device is entirely automatic, and propane vapor will be used in the final gas mixture only when necessary. Thus, assuming adjustment of valve 8 to insure a pressure of at least 18.8 pounds absolute within tank 5, if the ambient temperature is at 50 degrees F. no propane vapor will flow into the tank 5 since the vapor pressure of the butane itself will exceed the aforementioned value of 18.8 pounds absolute, and will act through conduit 8ª to effect closure of valve 8. At 10 degrees F. the vapor discharged from tank 5 will consist of approximately 50 per cent butane and 50 per cent propane, and at 40 degrees below zero F. the proportions will be approximately 12.2 per cent butane and 87.8 per cent propane. Under no conditions above 40 degrees below zero F. will there be any condensation of either butane or propane in the storage holder 9 at 75 pounds gauge pressure. At temperatures above 40 degrees below zero F. only slightly larger quantities of propane will be used than are necessary to prevent condensation in holder 9.

It should be noted that if pure butane were used without iso-butane, propane or a similar more volatile liquid present, then at a temperature of 20 degrees below zero F. the final gas mixture within tank 9 would have to be reduced to substantially atmospheric pressure to prevent condensation of the butane vapor. In other words, the capacity of tank 9 would become 1; whereas by the provision of means for utilizing the characteristics of propane vapor as described herein, the final gas mixture may always be maintained at the aforementioned high pressure, so that the capacity of tank 9 becomes 5.9,—not only for a temperature of 20 degrees below zero F., but also for a temperature as low as 40 degrees below zero F.

As aforeindicated, at temperatures of substantially 50 degrees F. and above substantially pure butane vapor will be discharged from tank 5, whereas at temperatures below 50 degrees F. varying proportions of propane vapor will be discharged from said tank. The discharge conduit is indicated by the numeral 10, said conduit having therein a normally closed valve 11 which is of the electromagnetically operable type, the same having a coil 11ª to be energized for opening the valve when the gas making operation is initiated. Also included in conduit 10 is a pressure regulating valve 12 of well known form, said valve being preferably adjusted to insure a reduction in pressure of the gas discharged from tank 5 to a value only slightly above atmospheric pressure. A surge tank 13 of suitable size is included in conduit 10, the purpose of which tank is to prevent or eliminate pulsations in the flowing stream of gas. A valve 14 is likewise provided, said valve being automatically operable in the manner hereinafter described to vary the rate of flow of the generated gas or gases.

Connected with conduit 10 at the point shown is a conduit 15 the outer end of which may be open to atmosphere. A valve 16 is included in conduit 15, said valve being normally closed and having a coil 16$^a$ to be energized for opening the valve when the gas making operation is initiated. Also included in conduit 15 is a valve 17 which may be manually adjusted to vary the rate of flow of air through said conduit. The gas from conduit 10 and the air from conduit 15 are drawn through and mixed within a conduit 18 which is connected with the intake of a power-driven compressor or pump 19,—the mixture of air and gas being discharged from the compressor at substantially 75 pounds gauge pressure, whence it passes through conduit 20 to the storage holder or tank 9. A check valve such as the flap valve indicated at 21 is preferably provided within conduit 20 to prevent back flow of the final mixed gas to the compressor when the latter is not in operation.

At a point preferably between tank 9 and valve 21 a continuous sample of the final mixed gas is withdrawn through conduit 22 to be supplied to a calorimetric device indicated in general by the numeral 23. A pressure regulating valve 24 is provided in conduit 22 to reduce the pressure of the gas sample to approximately atmospheric pressure. Conduit 22 may likewise be provided with a restricted orifice 25 and a venting burner 26 to insure a reduction of the sample to atmospheric pressure prior to passage thereof to the calorimetric device. Calorimetric device 23 is preferably of the quick-acting type disclosed in my copending application filed May 29, 1931, Serial No. 540,863, and detailed discussion thereof is deemed unnecessary herein. However, it is to be understood that device 23 functions to ascertain the total heating value per unit volume of the final gas mixture flowing in conduit 20, and any variation in such value with respect to a preselected value (say, 550 B. t. u. per cubic foot) will result in operation of a motor 27 in one direction or the other to effect movement of valve 14 toward its open or its closed position for varying the volumetric proportionality of gas flowing in conduit 10 with respect to the air flowing in conduit 15, whereby a final flowing mixture of substantially constant total heating value per unit volume is insured.

As shown the compressor 19 is adapted to be driven by an electric motor 19$^a$ through the medium of a belt 19$^b$ or the like. Motor 19 is adapted to be connected to a suitable source of energy supply, indicated by lines L$^1$, L$^2$ and L$^3$, upon joint closure of a manually operable knife switch 28 and an electro-magnetically operable switch 29. Switch 28 will normally be closed,—the primary purpose thereof being to provide for discontinuance of the gas making and compressing operations at will independently of the automatic control means therefor.

Said automatic control means comprises the switch 29 aforementioned, the operating coil of which is indicated at 29$^a$, and a pressure responsive switch designated in general by the numeral 30. Switch 30 is provided with opposed fixed contacts 30$^a$ and 30$^b$ and an oscillatable contactor 30$^c$. Contactor 30$^c$ is provided with pressure responsive operating means which is connected through conduit 31 to the gas storage tank 9. Assuming, as aforedescribed, that it is desired to maintain within tank 9 a gauge pressure of approximately 75 pounds, the arrangement is preferably such that contactor 30$^c$ will be moved automatically into engagement with contact 30$^a$ when the pressure within tank 9 has fallen slightly below such value. An energizing circuit will thus be provided for the coil 29$^a$ of switch 29, said circuit extending from line L$^1$ by conductor 32 through contactor 30$^c$ and contact 30$^a$, conductor 33 through the coil 29$^a$, and by conductors 34 and 35 through a protective resistance 36 to line L$^3$. The armature 29$^b$ of switch 29 is thus attracted, with consequent closure of the contacts 29$^c$ of the latter whereby an energizing circuit is completed for the compressor motor 19$^a$.

It will be noted that coils 11$^a$ and 16$^a$ of valves 11 and 16, respectively, are connected across lines L$^1$, L$^3$ of said motor circuit to effect opening of said valves immediately upon starting of the compressor motor. Switch 29 is provided with normally open auxiliary contacts 29$^d$ which when closed provide a maintaining circuit for coil 29$^a$; said circuit extending through conductor 37 in shunt to contactor 30$^c$ and contact 30$^a$, as will be obvious. The compressor 19 is thereupon operated until the pressure within tank 9 reaches or slightly exceeds the preselected value (75 pounds gauge) whereupon contactor 30$^c$ engages contact 30$^b$ to provide a circuit shunting coil 29$^a$; said circuit extending from line L$^1$ by conductor 32 through contactor 30$^c$, contact 30$^b$, conductor 38 and conductor 35 to line L$^3$. Coil 29$^a$ is thus deenergized to open switch 29 with consequent stopping of the compressor motor 19$^a$. At the same time coils 11$^a$ and 16$^a$ are deenergized to effect closure of valves 11 and 16.

As shown switch 29 is preferably provided with a pair of normally open contacts 29$^e$ which are adapted upon stopping of the compressor motor to likewise insure interruption of the circuit connections for the valve adjusting reversible motor 27. While I have shown a worm and pinion driving connection 27ᵃ between motor 27 and valve 14, it is to be understood that any other suitable form of reduction gearing may be substituted therefor.

A distributing conduit 39 leads from tank 9 to any suitable point or points of use of the mixed gas; said conduit being preferably provided with a pressure regulating valve 40 whereby the mixed gas may be distributed at any desired pressure lower than the pressure thereof within tank 9. The mixed gas is thus discharged from tank 9 in accordance with the consumption demand, and when the pressure within said tank falls below the preselected value the mechanism aforedescribed acts automatically to again initiate the gas mixing and compressing operations.

In those butane gas plants now in existence wherein two liquid butane storage tanks are employed only minor piping changes will be necessary to transform the same into plants of the character herein contemplated,—the additional tank being utilized for storage of the liquid propane and communication between the tanks being controlled by a pressure regulating valve of the type shown at 8 in the drawing. Even if only one tank is available in the existing plant, it is probable that a small propane storage tank can be added to the system at a cost less than the cost of lagging the butane storage tank or vaporizer.

While I have herein specifically described a method and apparatus wherein liquid butane and liquid propane are employed, it is to be understood that other volatile liquids or liquid gases may be employed in accordance with the teachings of my invention, the primary requisite of course being that one of the liquids shall have a higher vapor tension, or be more volatile, than another of the liquids employed.

What I claim as new and desire to secure by Letters Patent is:

1. The method of making combustible gas, which comprises depositing within a closed container a body of volatile combustible liquid, such as butane, depositing within a second closed container a body of more volatile combustible liquid, such as propane, subjecting said liquids to like ambient temperature conditions to provide for development of substantially different vapor pressures within the respective containers, controllably venting the vapor from said second mentioned container to said first mentioned container in accordance with variations in pressure in the latter to maintain said last mentioned pressure above a predetermined minimum value, controllably venting the vapor from said first mentioned container to provide a vapor flow at a substantially constant predetermined pressure, effecting a substantially constant flow of air for mixture with said vapor, extracting and burning a continuous sample of the mixed air and vapor to calorimetrically determine the quality or total heating value per unit volume of the combustible mixture, varying the rate of flow of said vapor in accordance with and to compensate for variations in said value with respect to a preselected value, compressing said combustible mixture and storing the same within a suitable container, and automatically controlling the compressing operation to provide a substantially constant pressure of the combustible mixture within said storage container.

2. The method which comprises separately enclosing a plurality of bodies of volatile combustible liquids, at least one of which liquids is vaporable automatically under substantially all normal atmospheric temperature conditions and said liquids having substantially different vapor pressures under like temperature conditions, controllably venting and mixing the vapors of said liquids in accordance with the vapor pressure of one of the latter, effecting a flow of said mixed vapors at a substantially constant pressure, effecting a flow of air at a like pressure for mixture with said vapors, conveying the mixture under relatively high pressure to a suitable storage container, withdrawing and burning a continuous sample of said mixture in its passage to said storage container to determine the total heating value per unit volume of said mixture, varying the relative rates of flow of the mixed vapors and air in accordance with the determinations so effected, whereby the total heating value per unit volume of said mixture is maintained substantially constant, and automatically discontinuing the flows of said mixed vapors and air when the pressure within said storage container exceeds a predetermined value.

3. The method which comprises separately enclosing a plurality of bodies of volatile combustible liquids, at least one of which liquids is vaporable automatically under substantially all normal atmospheric temperature conditions and said liquids having substantially different vapor pressures under like temperature conditions, controllably venting and mixing the vapors of said liquids in accordance with the vapor pressure of one of the latter, effecting a flow of said mixed vapors at a substantially constant pressure, effecting a flow of air at a like pressure for mixture with said vapors, conveying the mixture under relatively high pressure to a suitable storage container, withdrawing and burning a continuous sample of said mixture in its passage to said storage container to determine the total heating value per unit volume of said mixture, varying the relative rates of flow of the mixed vapors and air in accordance with the determinations so effected, whereby the total heating value per unit volume of said mixture is maintained substantially constant, and automatically initiating or temporarily interrupting the flows of said mixed vapors and air upon given variations in pressure within said storage container with respect to a predetermined value.

4. In gas making apparatus, in combination, a closed container, a body of volatile combustible liquid partially filling said container, the vapor pressure of said liquid varying in accordance with variations in the ambient temperature to which the same is subjected, a second closed container, a more volatile combustible liquid of higher vapor pressure partially filling said last mentioned container, a conduit connecting said containers, a valve in said conduit, means responsive to the pressure condition within said first mentioned container for controlling said valve whereby the pressure within said first mentioned container is maintained above a predetermined minimum value, a discharge conduit leading from said first mentioned container, regulating means within said conduit to insure a vapor flow of substantially constant pressure, calorimetric means for varying the volumetric rate of said vapor flow to compensate for variations in the quality or potential heating value per unit volume of the latter, means for mixing said vapor flow with a flow of air or similar gaseous fluid to provide a final combustible mixture of predetermined quality or potential heating value per unit volume, said calorimetric means being adapted to burn a continuous sample of said final combustible mixture, a storage container for said final combustible mixture, a compressor for supplying said mixture to said container, and means responsive to variations of pressure within said container for controlling the operation of said compressor.

5. In gas making apparatus, in combination, a closed container, a body of volatile combustible liquid partially filling said container, the vapor pressure of said liquid varying in accordance with variations in the ambient temperature to which the same is subjected, a second closed container, a more volatile combustible liquid of higher vapor pressure partially filling said last mentioned container, a conduit connecting said containers, a valve in said conduit, means responsive to the pressure condition within said first mentioned container for controlling said valve whereby the pressure within said first mentioned container is maintained above a predetermined minimum value, a discharge conduit leading from said first mentioned container, regulating means within said conduit to insure a vapor flow of substantially constant pressure, calorimetric means for varying the volumetric rate of said vapor flow to compensate for variations in the quality or potential heating value per unit volume of the latter, means for mixing said vapor flow with a flow of air or similar gaseous fluid to provide a final combustible mixture of predetermined quality or potential heating value per unit volume, said calorimetric means being adapted to burn a continuous sample of said final combustible mixture, a storage container for said final combustible mixture, a compressor for supplying said mixture to said container, means responsive to variations of pressure within said container for controlling the operation of said compressor, a distributing conduit leading from said storage container, and a pressure responsive regulating valve for maintaining a substantially constant pressure within said distributing conduit.

In witness whereof, I have hereunto subscribed my name.

EDWIN X. SCHMIDT.